(12) United States Patent
Holtzman et al.

(10) Patent No.: US 6,400,272 B1
(45) Date of Patent: Jun. 4, 2002

(54) WIRELESS TRANSCEIVER FOR COMMUNICATING WITH TAGS

(75) Inventors: Henry N. Holtzman, Wext Roxbury, MA (US); Jeff Mock, San Francisco, CA (US)

(73) Assignee: Presto Technologies, Inc., Cambridge, MA (US)

( * ) Notice: Subject to any disclaimer, the term of this patent is extended or adjusted under 35 U.S.C. 154(b) by 0 days.

(21) Appl. No.: 09/539,768

(22) Filed: Mar. 31, 2000

Related U.S. Application Data (60) Provisional application No. 60/127,329, filed on Apr. 1, 1999, and provisional application No. 60/144,145, filed on Jul. 16, 1999.

(51) Int. Cl.[7] .............................................. G08B 13/14
(52) U.S. Cl. ...................................... 340/572.1; 361/56
(58) Field of Search .......................... 340/572.1, 572.2, 340/572.3, 572.4, 551; 361/56

(56) References Cited

U.S. PATENT DOCUMENTS

| | | | |
|---|---|---|---|
| 4,471,345 A | * 9/1984 | Barrett, Jr. ................ | 340/572 |
| 4,724,427 A | * 2/1988 | Carroll ..................... | 340/572 |
| 5,013,047 A | 5/1991 | Schwab .................... | 273/238 |
| 5,086,389 A | 2/1992 | Hassett et al. ............. | 364/401 |
| 5,129,654 A | 7/1992 | Bogner .................... | 273/238 |
| 5,188,368 A | 2/1993 | Ryan ....................... | 273/237 |
| 5,287,112 A | 2/1994 | Schuermann .............. | 342/42 |
| 5,330,380 A | 7/1994 | McDarren et al. ......... | 446/397 |
| 5,347,280 A | 9/1994 | Schuermann .............. | 342/42 |
| 5,374,930 A | 12/1994 | Schuermann .............. | 342/42 |
| 5,491,715 A | 2/1996 | Flaxl ........................ | 375/344 |
| 5,530,702 A | 6/1996 | Palmer et al. ............. | 370/85.3 |
| 5,541,604 A | 7/1996 | Meier ....................... | 342/42 |
| 5,629,981 A | 5/1997 | Nerlikar ................... | 380/25 |
| 5,640,002 A | * 6/1997 | Ruppert et al. ............ | 235/472 |
| 5,678,041 A | 10/1997 | Baker et al. ............... | 395/609 |
| 5,696,898 A | 12/1997 | Baker et al. ............... | 395/187.01 |
| 5,735,742 A | 4/1998 | French ..................... | 463/25 |
| 5,739,766 A | * 4/1998 | Chaloux ................... | 340/572 |
| 5,742,237 A | * 4/1998 | Bledsoe .................... | 310/572 |
| 5,745,036 A | 4/1998 | Clare ....................... | 340/572 |
| 5,769,051 A | 6/1998 | Bayron et al. ............. | 123/335 |
| 5,803,043 A | 9/1998 | Bayron et al. ............. | 123/335 |

(List continued on next page.)

FOREIGN PATENT DOCUMENTS

| | | |
|---|---|---|
| DE | 3813779 A1 | 11/1989 |
| DE | 40 15 482 C1 | 7/1991 |
| EP | 0 496 344 B1 | 1/1992 |
| EP | 0 496 344 A1 | 1/1992 |
| FR | 2 607 400 | 6/1988 |
| GB | 2 237 514 A | 5/1991 |
| SE | 78121902 | 9/1980 |
| WO | 98/39702 | 2/1998 |
| WO | WO 98/20411 | 5/1998 |
| WO | WO 98/38761 | 9/1998 |
| WO | WO 98/51035 | 11/1998 |
| WO | WO 98/51036 | 11/1998 |
| WO | WO 98/51077 | 11/1998 |
| WO | WO 99/04326 | 1/1999 |
| WO | WO 99/13391 | 3/1999 |
| WO | WO 00/05668 | 2/2000 |

*Primary Examiner*—John A. Tweel, Jr.
(74) *Attorney, Agent, or Firm*—Testa, Hurwitz & Thibeault, LLP (57) ABSTRACT

In general, in one aspect, the invention features a system and method for communicating with a RFID tag. The method includes receiving a signal from a RFID tag, and identifying the tag type from the RFID tag signal. In another aspect, the invention features a system and method for communicating tag receiver to a computer, and transmitting a receiver identifier from the tag information. The method includes transmitting tag information from a tag receiver to a computer.

23 Claims, 7 Drawing Sheets

U.S. PATENT DOCUMENTS

| | | | |
|---|---|---|---|
| 5,804,803 A | 9/1998 | Cragun et al. | 235/375 |
| 5,805,082 A | 9/1998 | Hassett | 340/928 |
| 5,815,355 A * | 9/1998 | Dawes | 361/56 |
| 5,823,782 A | 10/1998 | Marcus et al. | 434/156 |
| 5,853,327 A | 12/1998 | Gilboa | 463/39 |
| 5,889,958 A | 3/1999 | Willens | 395/200.59 |
| 5,892,211 A | 4/1999 | Davis et al. | 235/380 |
| 5,902,353 A | 5/1999 | Reber et al. | 709/219 |
| 5,903,729 A | 5/1999 | Reber et al. | 395/200.49 |
| 5,920,261 A * | 7/1999 | Hughes et al. | 340/572 |
| 5,933,829 A | 8/1999 | Durst et al. | 707/10 |
| 5,938,726 A | 8/1999 | Reber et al. | 709/217 |
| 5,938,727 A | 8/1999 | Ikeda | 709/218 |
| 5,940,595 A | 8/1999 | Reber et al. | 395/200.57 |
| 5,950,173 A | 9/1999 | Perkowski | 705/26 |
| 5,952,935 A * | 9/1999 | Mejia et al. | 340/825.54 |
| 5,953,051 A | 9/1999 | Fielding et al. | 348/15 |
| 5,959,530 A | 9/1999 | Lupien, Jr. et al. | 340/568.1 |
| 5,963,136 A | 10/1999 | O'Brien | 340/573.1 |
| 5,978,773 A | 11/1999 | Hudetz et al. | 705/23 |
| 5,983,273 A | 11/1999 | White et al. | 709/229 |
| 5,986,651 A | 11/1999 | Reber et al. | 345/335 |
| 5,987,611 A | 11/1999 | Freund | 713/201 |
| 5,987,612 A | 11/1999 | Takagawa et al. | 713/201 |
| 5,992,752 A | 11/1999 | Wilz, Sr. et al. | 235/472.01 |
| 5,995,105 A | 11/1999 | Reber et al. | 345/356 |
| 5,995,898 A | 11/1999 | Tuttle | 701/102 |
| 6,018,619 A | 1/2000 | Allard et al. | 398/200.54 |
| 6,018,718 A | 1/2000 | Walker et al. | 705/14 |
| 6,024,142 A | 2/2000 | Bates | 141/94 |
| 6,025,780 A | 2/2000 | Bowers et al. | 340/572.23 |
| 6,032,195 A | 2/2000 | Reber et al. | 709/245 |
| 6,037,928 A | 3/2000 | Nachinson et al. | 345/156 |
| 6,039,247 A | 3/2000 | Reccia et al. | 235/379 |
| 6,070,156 A | 5/2000 | Hartsell, Jr. | 705/413 |
| 6,073,840 A | 6/2000 | Marion | 235/381 |
| 6,081,827 A | 6/2000 | Reber et al. | 709/200 |
| 6,085,247 A | 7/2000 | Parsons, Jr. et al. | 709/227 |
| 6,085,805 A | 7/2000 | Bates | 141/94 |
| 6,089,284 A | 7/2000 | Kaehler et al. | 141/94 |
| 6,098,879 A | 8/2000 | Terranova | 235/384 |
| 6,101,486 A | 8/2000 | Roberts et al. | 705/27 |
| 6,108,656 A | 8/2000 | Durst et al. | 707/10 |
| 6,112,152 A | 8/2000 | Tuttle | 701/115 |
| 6,116,505 A | 9/2000 | Withrow | 235/381 |
| 6,122,737 A | 9/2000 | Bjorn et al. | 713/186 |
| 6,125,192 A | 9/2000 | Bjorn et al. | 382/124 |
| 6,125,352 A | 9/2000 | Franklin et al. | 705/26 |
| 6,131,811 A | 10/2000 | Gangi | 235/380 |
| 6,138,151 A | 10/2000 | Reber et al. | 709/219 |

* cited by examiner

FIG. 6 ations. The different properties of the different tags often receiver identifier from the transmitter and communicating the tag

WIRELESS TRANSCEIVER FOR COMMUNICATING WITH TAGS

CROSS-REFERENCE TO RELATED APPLICATIONS

This application claims priority to U.S. provisional patent application Ser. No. 60/127,329, filed Apr. 1, 1999, and this application claims priority to U.S. provisional patent application Ser. No. 60/144,145, filed July 16, 1999.

TECHNICAL FIELD

This invention relates to communication with wireless tags and, more particularly to a method and system for communicating with multiple types of tags.

BACKGROUND INFORMATION

A tag is a wireless electronic device that communicates with a reader. Typically, tags consist of an integrated circuit and a coil. The coil acts as a source of power, as a receiving antenna, and a transmitting antenna. The integrated circuit includes wireless communications components, and at least some memory. The reader directs an electromagnetic (i.e. radio) signal to the tag, referred to as "illuminating" the tag. For example, for some tags, the signal frequency is 125 KHz. A tag is tuned to the frequency broadcast by the reader, and receives power from the 125 KHz signal. Upon power-on, the tag performs certain operations, which generally include transmitting information and receiving instructions. Depending on the type of tag, the instructions can include data requests, or information to be stored in tag memory. The actions taken by a tag when the tag is illuminated, and the capabilities of the tag, are different for each tag type and model.

There are tags commercially available from companies such as EM Microelectronic-Marin SA of Marin, Switzerland ("Marin"), Philips Semiconductors of Sunnyvale, Calif. and Microchip Technology, Inc. of Chandler, Ariz. The various tags have some similar properties and some different properties. The different properties of the different tags often are not an operational barrier, since, generally, the same type of tags are used in a particular system implementation. However, in some implementations, a reader that only reads one type of tag can be unduly limited.

SUMMARY OF THE INVENTION

In general, in one aspect, the invention features a method for communicating with a RFID tag. The method includes receiving a signal from a RFID tag, and identifying the tag type from the RFID tag signal. In one embodiment, the method includes the step of parsing the signal as a start signal for the identified tag type. In another embodiment, the method includes the step of receiving Manchester encoded data. In another embodiment, the method includes the step of sending a data request to the tag based on the tag type. In another embodiment, the method includes the step of receiving information stored in the tag in response to the request. In another embodiment, the receiving step includes receiving a signal from the RFID tag and identifying the tag type from the RFID tag signal. In another embodiment, the receiving step includes parsing the start signal for the identified tag type and receiving Manchester encoded data comprising the information stored in the tag. In another embodiment, the method includes the step of communicating the received information to a computer. In another embodiment, the method includes the step of decoding the Manchester encoded data, and communicating the decoded data to a computer. In another embodiment, the method includes the step of communicating a receiver identifier to the computer.

In general, in another aspect, the invention features a method for communicating tag information that includes transmitting tag information from a tag receiver to a computer and transmitting a receiver identifier from the tag receiver to the computer.

In general, in another aspect, the invention features a system for communicating with a RFID tag that includes a receiver for receiving a signal from a RFID tag and an identification module for identifying the tag type from the RFID tag signal. In one embodiment, the identification module parses the signal as a start signal for the identified tag type. In another embodiment, the receiver receives Manchester encoded data. In another embodiment, the receiver sends a data request to the tag based on the tag type. In another embodiment, the receiver receives information stored in the tag in response to the request. In another embodiment, the information is received by the receiver receiving a signal from the RFID tag; and the identifier identifies the tag type from the RFID tag signal. In another embodiment, the information is received by the receiver by parsing the start signal for the identified tag type and then receiving Manchester encoded data comprising the information stored in the tag. In another embodiment, the system includes a transmitter communicating the received information to a computer. In another embodiment, the transmitter communicates the decoded Manchester encoded data to a computer. In another embodiment, the transmitter communicates a receiver identifier to the computer.

In general, in another aspect, the invention features a system for communicating tag information that includes a receiver identifier and a transmitter for transmitting tag information and the receiver identifier from a tag receiver to a computer. In one embodiment, the system also includes a computer receiving the tag information and the receiver identifier from the transmitter and communicating the tag information and the receiver identifier over a network.

The foregoing and other objects, aspects, features, and advantages of the invention will become more apparent from the following description and from the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DESCRIPTION

Figure 1:
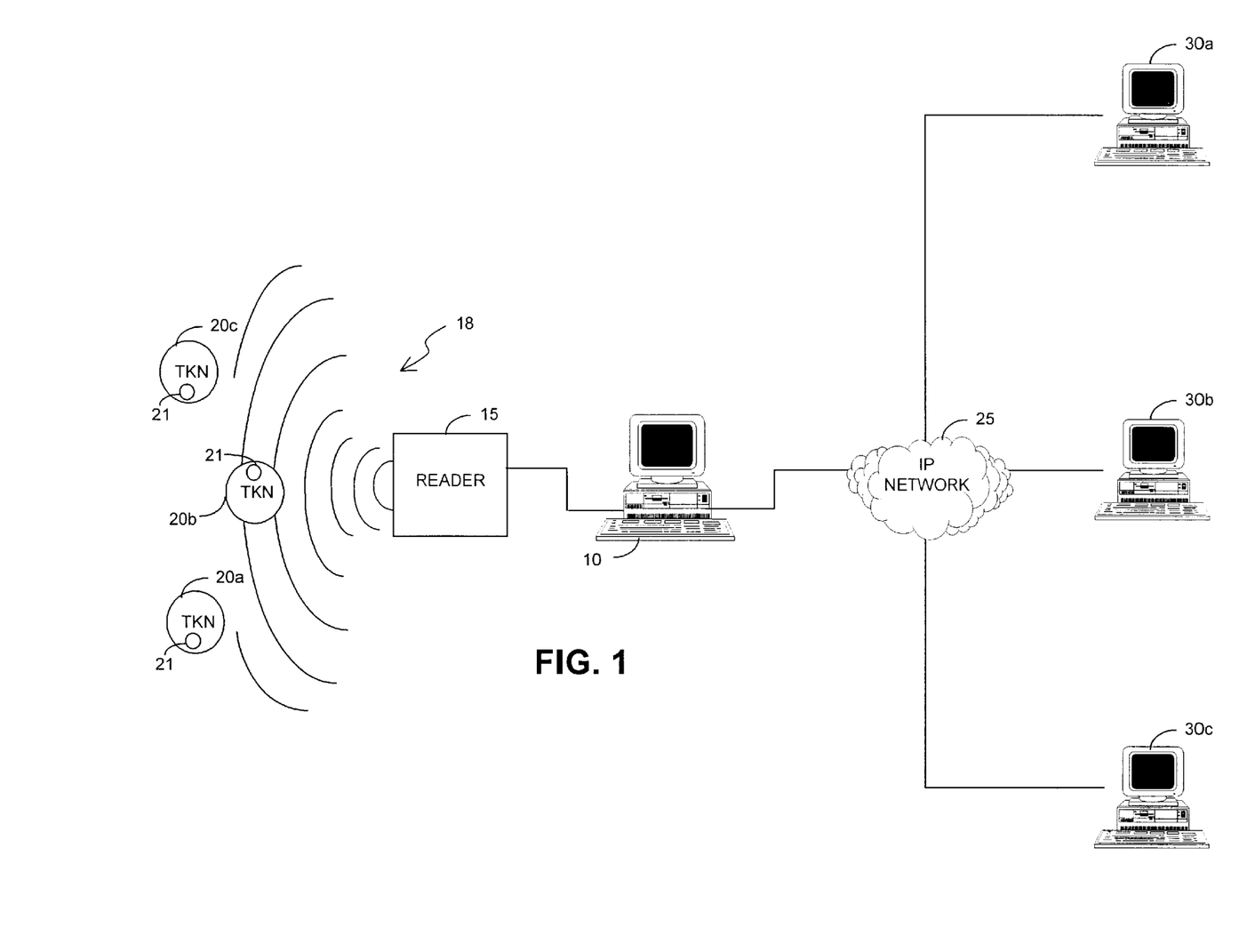
FIG. 1 is an embodiment of a system according to the invention.

Referring to FIG. 1, in one embodiment, a computer 10 is in communication with a RFID reader 15. In one embodiment, the communication takes place over a standard interface, such as serial, parallel, universal serial bus ("USB"), and so on. The RFID reader 15 emits a signal 18. A series of tokens 20a, 20b, 20c each contains an embedded RFID tag 21. If a token, generally 20, is within range of the signal 18, the RFID tag 21 will respond by providing its identifier, and possibly other information, to the reader 15. The term "token" includes not only small items such as easily carried cards or "poker chip" disks whose purpose is to serve as housings for the RFID tags, but also more commonplace articles—keychains, product containers, even household appliances—that incorporate RFID tags.

Typical RFID tags 21 include a small, low-power microchip combined with an antenna. The reader 15 transmits the excitation signal 18 that is received by the microchip via the antenna. The microchip uses the excitation signal 18 both as a source of power and as means of imparting information back to reader 15. For example, upon receiving power, the microchip may alter its input impedance in a temporal pattern specified by permanently stored instructions, the pattern conveying a unique digital code or identifier associated with the particular microchip. This pattern is registered by reader 15 as changes in reflected power, which are interpreted by reader 15 to reproduce the code and provide this to computer 10.

For example, the Marin 4100 is a read-only tag, meaning that it is not capable of receiving or storing data in memory. When powered by an excitation signal 18, the Marin 4100 repeatedly transmits its serial number. As another example, the Marin 4050 transmits its serial number like the Marin 4100, and it also can receive and store data, in its electrically erasable programmable read-only memory ("EEPROM"). This memory can be used to store data that is persistent from one excitation of a tag until then next excitation. The Philips HITAG-1 can read and write EEPROM, and also has a password protection scheme for access to the data in the tag. The Philips HITAG-2 can be configured to act like the Marin 4100 in one mode, and in another mode, acts according to a different protocol.

The tags mentioned above, in particular the Marin and the Philips tags, use Manchester encoding to encode the data that is transmitted. The Manchester-encoded data is measured in T units, where a T unit is a cycle (e.g. 8 uS) of the antenna frequency (e.g. 125 KHz). If, as occurs with certain Marin tags in certain configurations, data transmission cells (that is, the transmission time for one bit of information) is 64 T, at 125 KHz the duration of each data cell is 512 uS. Other cell durations are used in other configurations. The Marin 4050 has a "listen window", sometimes abbreviated "LIW," sequence, which is determined by a 128 T pulse, followed by a 64 T pulse, and then the transmission of the tag serial number. The 64 T pulse is the listen window in which the terminal (transceiver) can transmit requests to the 4050 tag. Terminal software, for example, can look for this listen window, and send a command to the tag during the listen window.

The computer 10 is also connected to a computer network 25. In one embodiment, the network uses the Internet routing and transmission protocols (TCP/IP). In other embodiments, other protocols are used. By virtue of its connection to network 25, computer 10 is capable of establishing connections to and exchanging data with any other computer or "node" on the network 25. The network 25 may be the Internet or a smaller network such as an intranet. To establish a connection, a message and the destination address or name of the destination node is supplied to TCP/IP software running on the computer 10. The TCP/IP software communicates the address to network 25, which routes the message appropriately. In a typical Internet interaction, the computer 10 is a "client" and the contacted computer is a "server." Three servers are shown 30a, 30b, and 30c, generally 30. In one embodiment, each token 20 is associated with one of the servers 30, so that a token 20 causes the computer 10 to establish a connection with, and communicate with, one of the servers 30. In another embodiment, each token 20, in conjunction with the reader location, causes the computer 10 to establish a communication with, and communicate with, the closest server 30 (topographically or geographically).

Figure 2:
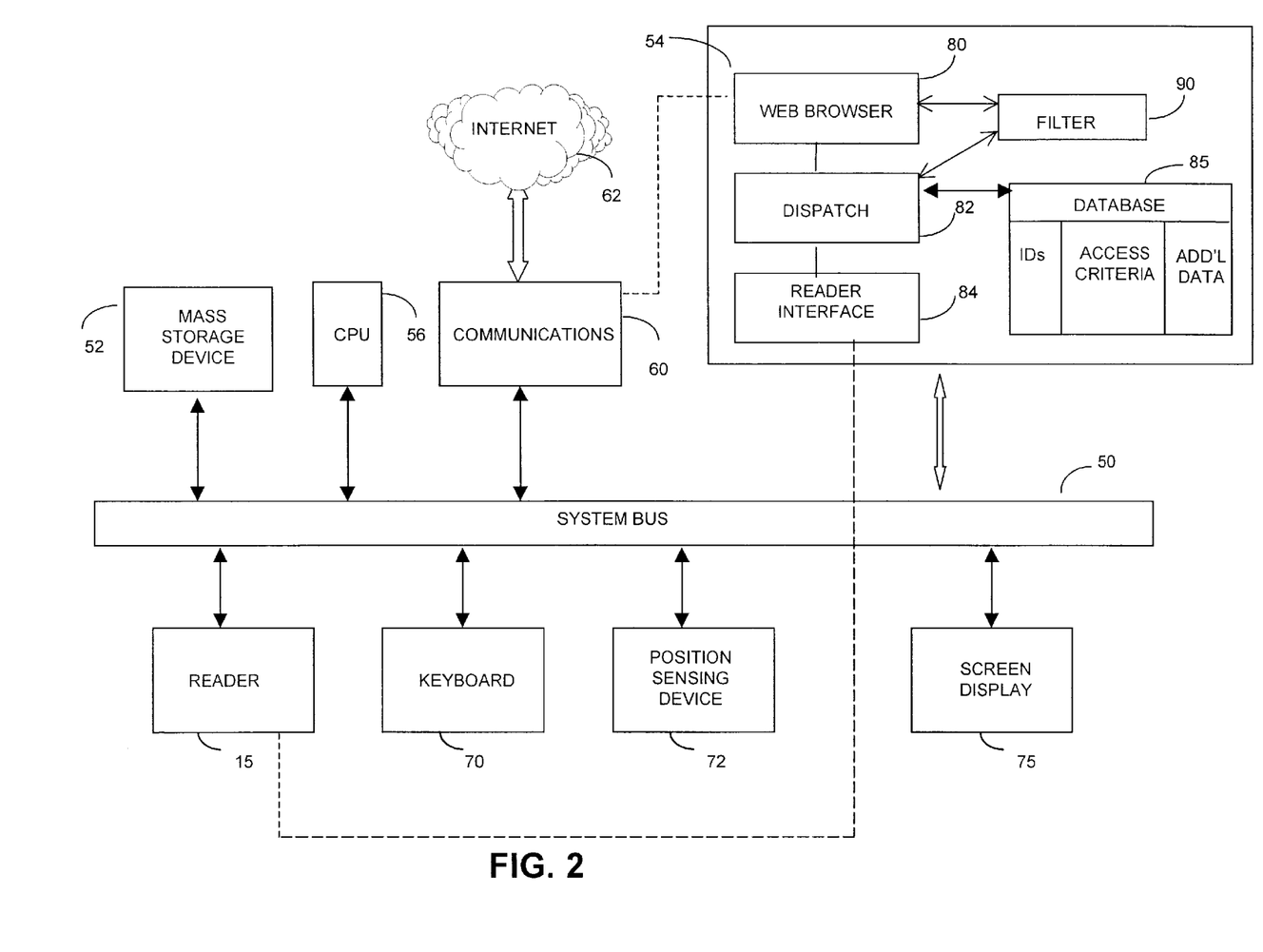
FIG. 2 is an embodiment of the system of FIG. 1.

Referring to FIG. 2, an embodiment of a client computer 10 includes a bidirectional bus 50 over which all computer 10 system components communicate. The computer 10 includes at least one mass storage device (such as a hard disk or optical storage unit) 52, and a main system memory 54. A central-processing unit ("CPU") 56 directs system operation. A conventional communication platform 60 includes suitable network interface capability and transmission hardware to facilitate connection to and data transfer through a computer network 62 (which may be the Internet) over a telecommunication link 64. For example, computer 10 may be part of a LAN connected directly to the Internet, in which case platform 60 represents the network adapter; or may instead by connected via an Internet service provider, in which case platform 60 represents a modem and a TCP/IP software stack. A user interacts with the computer 10 system using a keyboard 70 and/or a position-sensing device (e.g., a mouse) 72. The output of either device can be used to designate information or select particular areas of a screen display 75 to direct functions to be performed by the system.

The main memory 54 contains a group of modules that control the operation of CPU 56 and its interaction with the other hardware components. An operating system (not shown) such as MICROSOFT WINDOWS or UNIX directs the execution of low-level, basic system functions such as memory allocation, file management and operation of mass storage device 52, multitasking operations, input/output and basic graphics functions for output on screen display 75. The user's primary interactions with the network 62 occur over a web browser 80, which operates as a running process and contains functionality for establishing connections to other nodes on network 62, and for receiving from those nodes web pages (e.g., test files, audio files, multimedia files, etc.) each identified by a URL. Web browser 80 temporarily stores these and causes their display on screen 75, or other output device (i.e., speakers or other peripheral devices in communication wit computer 10), also executing hyperlinks contained in web pages and selected by the user, and generally interpreting web-page information. Browser 80 may be any of the numerous available web browsers, e.g., NETSCAPE COMMUNICATOR (supplied by Netscape Communications Corporation of Sunnyvale, Calif.), INTERNET EXPLORER (provided by Microsoft Corporation of Redmond, Wash.) or MOSAIC (different versions of which are available free of charge at a variety of web sites).

A dispatch module 82 receives reader signals from the reader 15 via a computer reader interface 84, which itself receives the reader's digital signals directly from bus 50. The dispatch module 82 and reader interface 84 are implemented as computer instructions executable by CPU 56, and run as active processes on the computer 10. Generally, reader 15 responds to tokens as they enter its range, as described further below. The reader interface 84 determines whether signals received from the reader 15 indicate the presence of a token, filtering noise and spurious signals. In one embodiment, the dispatch module 82 is configured to respond immediately to the presence of signals received from reader interface 84. When the dispatch module 82 receives an identifier from reader interface 84, it consults a database 85 to determine the action to be taken next.

The database 85 contains a series of access criteria, each of which is matched to an identifier or a group of identifiers (such that different combinations of tokens can uniquely specify particular actions). The database 85 can also contain additional information pertinent to particular identifiers. Accordingly, upon receipt of an identifier, the dispatch module 82 queries the database 85 to locate the corresponding access criterion and any other stored information relating to the identifier, and takes appropriate action. If desired, the identifier can be based not only on the identity of the token, but on reader 15 as well. That is, reader 15, can identify itself when transmitting the RFID contents of a token, so that the action taken by dispatch module 82 depends on both the token and the reader; the same token, therefore, can produce different actions on different readers.

In one embodiment, with a web browser 80 running as an active application process on computer 10, the dispatch module 82 obtains from the database 85 a URL associated with the received identifier, and causes web browser 80 to connect to the referenced server and download specified a web page. In one embodiment, the dispatch module 82 can also be configured to launch a web browser 80 upon receipt of an identifier if the web browser is not currently active. If the access criterion obtained from the database 85 contains data (e.g., identification or authorization information), the dispatch module 82 causes the browser 80 to forward this to the accessed server. The user is then free to interact with the server using the web browser 80. Unless and until another token reaches the vicinity of the reader 15, the dispatch module 82 takes no further action.

An access criteria can also specify an Internet blocking filter 90, as well as restriction parameters that determine the scope of its operation. If a filter 90 is not already running as an active process, the dispatch module 82, in response to an access criteria specifying the filter 90, launches it with any specified restriction parameters. The filter 90 then operates in the normal fashion, governing access by the web browser 80 to Internet files and sites.

The additional data linked to an identifier in database 85 is used to personalize the user's interaction with network 62, and may include historical information that permits the user to resume a previous session. For example, suppose that token 20 contains no more than an identifier. The access criteria corresponding to this identifier could include an authorization level, a filter program with attendant restrictions, and the URL of a preferred startup web page. The additional information associated with the identifier might include the token-holder's name, a set of "bookmarks" that specify URLs of the token-holder's frequently visited sites, and a list of the most recently visited sites. When the token-holder presents the token 20 to reader 15, the computer 10 immediately determines the token-holder's identity, and the web browser 80 is effectively customized for that individual. The web browser 80 accesses the token-holder's specified startup web page, and allows him or her to operate the web browser to revert to previously visited or bookmarked sites as if continuing the previous session.

Figure 3:
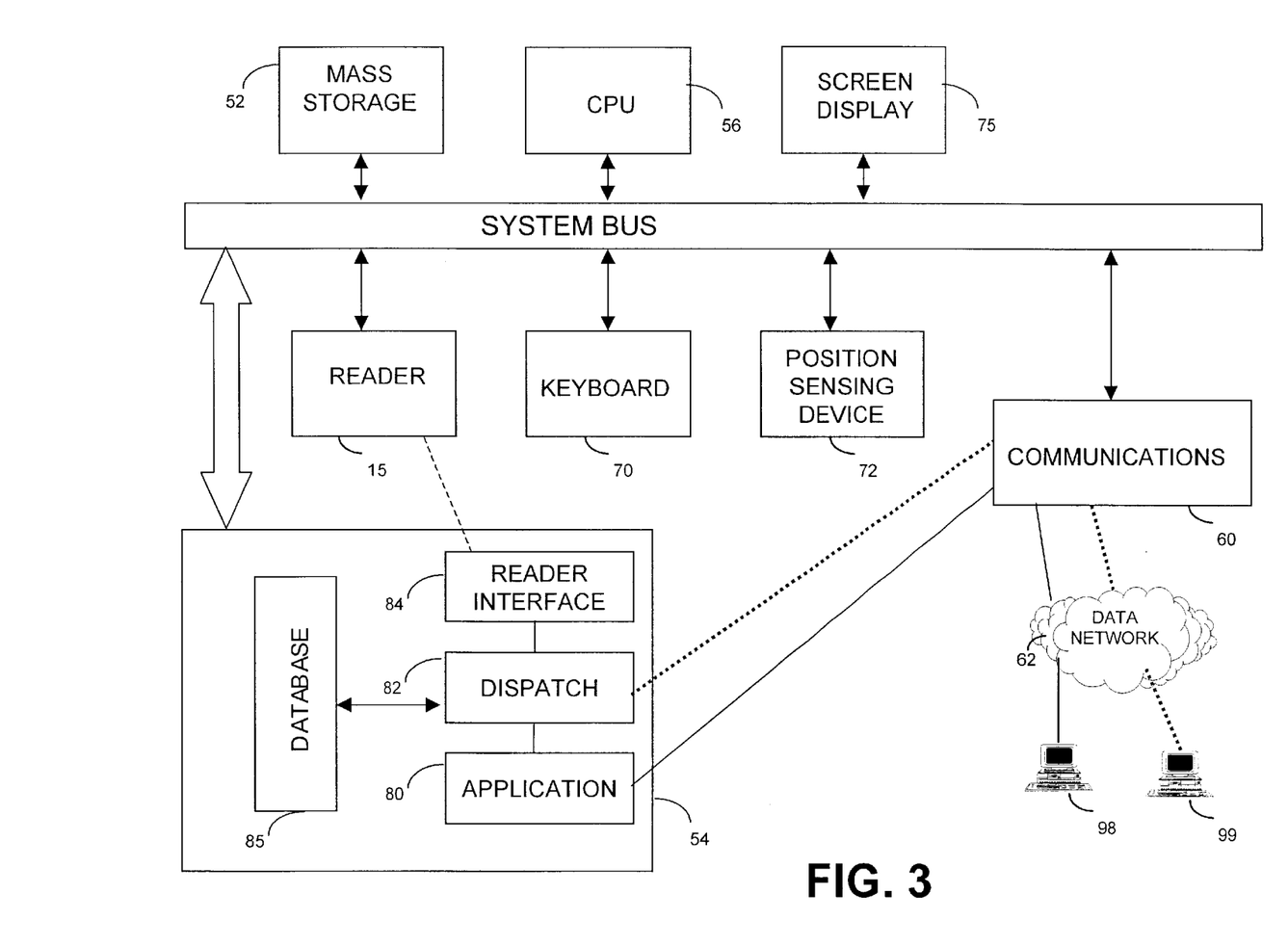
FIG. 3 is another embodiment of the system of FIG. 1.

Referring to FIG. 3, in another embodiment, the reader interface 84 determines whether signals received from reader 15 indicate the presence of a token. For example, the reader interface 84 checks data generated by the reader for proper format and parity, thus eliminating spurious signals due to noise. The dispatch module 82 responds to the presence of signals received from the reader interface 84. In one embodiment, the signals received from the reader interface 84 include a token identifier. In another embodiment, the signals received from the reader interface 84 include the type of token associated with the identifier. In another embodiment, the signal received from the reader interface include the software version of the reader 15. In another embodiment, the signal received from the reader interface include a reader identifier. Other information can be stored on the token besides the token identifier, and in another embodiment, that information is communicated by the reader interface 84 to the dispatch module 82.

In one embodiment of FIG. 3, the dispatch module 82 obtains the access criteria in response to the identifier from another computer 99 that is connected to the network 62. In one embodiment, the dispatch module 82 sends a request to the computer 99 such as the request described above with respect to the example of Table 1. The request can include the identifier and other information. The computer 99 responds with the access criteria, and possibly other information. In one embodiment, the computer 99 is a server for serving access criteria requests.

Based on the access criteria, and possibly other information communicated from the computer 99 to the dispatch module 82, the dispatch module 82 communicates with the application 80. In various embodiments, the application is a web browser, email application, text or graphic editor or viewer, or other content viewer or player.

The embodiment of FIG. 3 has the advantage of not requiring the database 85 on the user's computer to be kept up the date as new tokens (with new identifiers) are introduced because the identifier/access criterion matching is performed by the computer 99.

In one embodiment, the on-board database 85 is used to store identifiers, access criteria and other related information. In one embodiment, the database 85 acts as a cache to temporarily store the information and associated access criteria. In another embodiment, the database 85 accumulates and stores each identifier/access criteria once it is determined.

Figure 4:
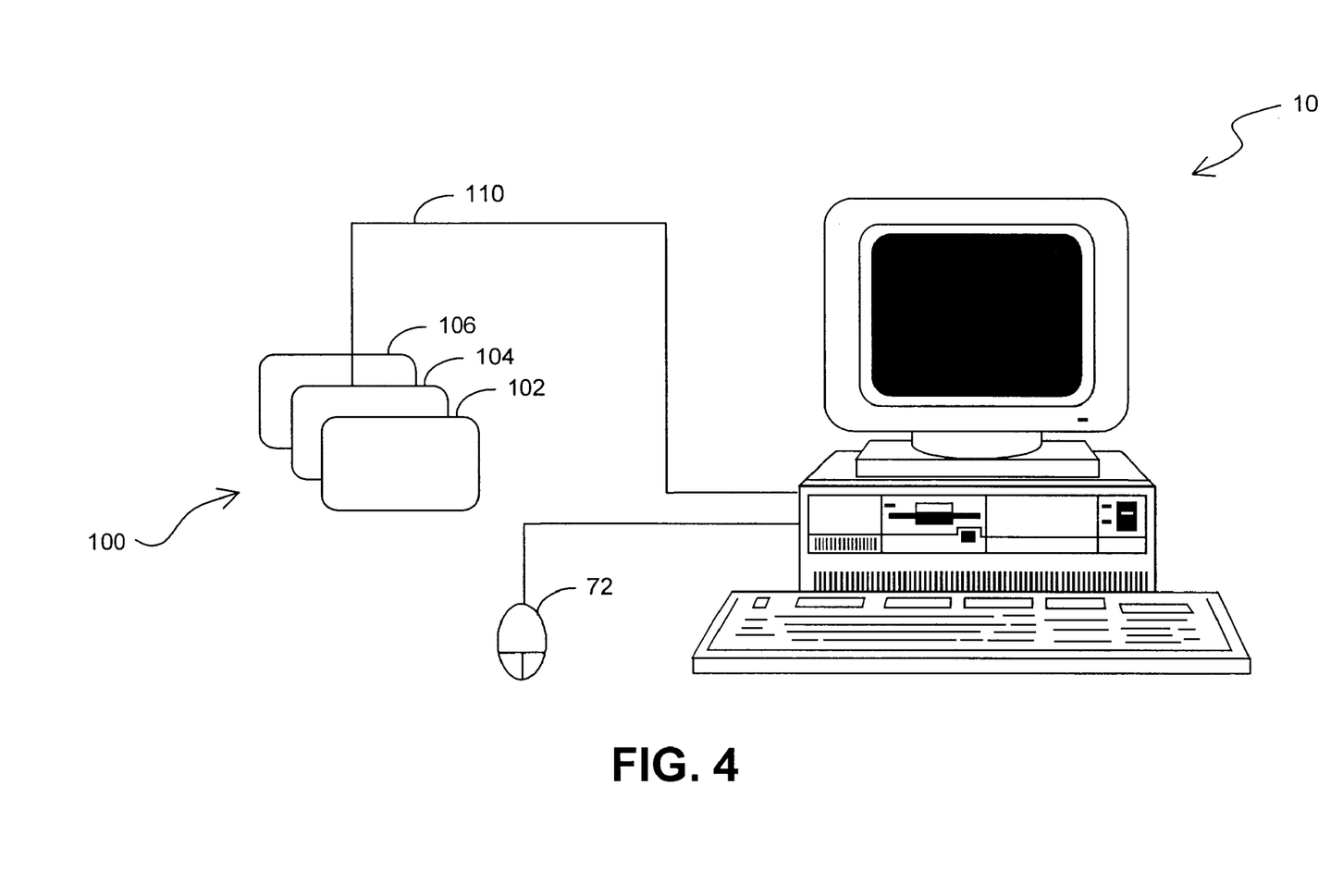
FIG. 4 is another embodiment of a system of FIG. 1 according to the invention.

Referring to FIG. 4, an embodiment of a reader 100 is designed to operate as a mouse pad, thereby physically disassociating it from the computer 10, while not adding a separate, dedicated piece of equipment to the system. The reader 100 shown in the figure is a multi-layer structure that includes a topmost mouse-pad layer 102, a circuitry layer 104, and a backing layer 106.

The topmost layer 102 includes a conventional mouse-pad surface designed to operatively receive a mouse such that the mouse rolls freely and reliably across the surface. The topmost layer 102 may also have a PVC stiffener behind the surface material. The circuitry layer 104 includes a closed-cell foam pad that provides resilience and houses the reader circuitry. For example, in one embodiment, circuitry layer 104 has cutouts of appropriate shape to receive electronic circuitry, thereby forming a protective, insulating boundary around the electronic components. In one embodiment, layer 104 is about 0.5 inches thick. Backing layer 106 is preferably a rubberized, non-skid material. Layers 102, 104, 106 have similar planar dimensions and are adhesively joined to one another to form a single, substantially continuous structure that rests on a surface in a flat configuration. The overall dimensions of the structure 100 are similar to those of conventional mouse pads, with perhaps some difference in thickness, depending on the thickness of the layers.

Circuitry layer 104 also contains a port for receiving one or more cables 110 that carry power and data. For example, in one embodiment, cable 110 is configured to carry serial data between the reader 100 and the computer 10, and power to operate the reader circuitry. In use, tokens are brought into proximity with the reader 100, or merely placed on surface layer 102, thereby causing the computer 10 to execute the operations described above.

In another embodiment of a reader (not shown), the multi-layer structure includes a topmost mouse-pad layer, a top casing layer, a circuitry layer, and a backing layer. The topmost layer includes a conventional mouse-pad surface designed to operatively receive a mouse such that the mouse rolls freely and reliably across the surface. The top casing layer is a plastic housing that serves to hold the mousing surface in place and protect the circuitry layer both electrically and physically. The circuitry layer consists of the electronic circuitry and antenna. This layer is the electrically active layer of the system. This layer is adhered to the backing layer. The backing layer is a flat piece of plastic with pieces of rubberized, non-skid material attached to it to prevent slippage on a smooth surface. The top casing layer and the backing layer have complementary planar dimensions and are adhesively joined to one another to encase the circuitry layer, and form a single structure that rests on a surface in a flat configuration. The mouse-pad layer can either rest on top of, or be adhered to this single structure. The overall dimensions of the structure are similar to those of conventional mouse pads, with some difference in thickness and shape, due to the plastic casing of the circuitry.

Figure 5:
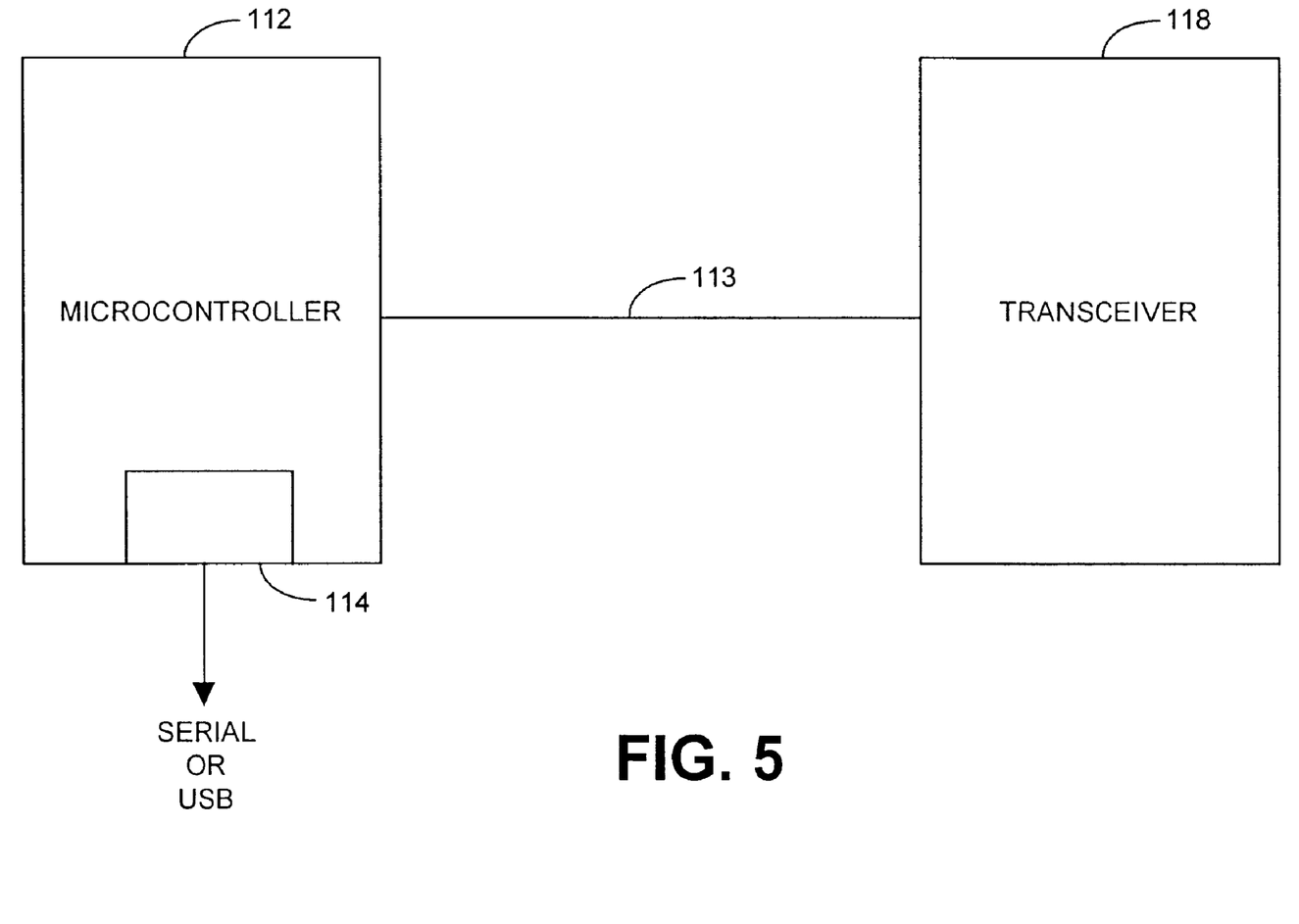
FIG. 5 is a schematic illustrating the circuitry of the mousepad of FIG. 4.

Referring to FIG. 5, an embodiment of the circuitry in circuitry layer 104 includes a transceiver 118 that is in communication with a microcontroller 112 via a communications line 113. In one embodiment, the transceiver 118 is a Philips HTRC-110 transceiver. In this embodiment, the communications line 113 includes three signal lines, a data-in signal line, a data-out signal line, and a clock line. The transceiver 118 provides raw data, which is based on the detection of the tag's response to the transceiver's 125 KHz transmission. The transceiver 118 provides raw bits, with no interpretation, to the microcontroller 112.

In one embodiment, the microcontroller 112 is an MC68HC705JB4 from Motorola, Inc., which includes a processor, program and data memory, and a USB serial interface. In another embodiment, the microcontroller 112 is implemented as a AT90S4414 from Atmel Corporation of San Jose, Calif., which includes a processor, program and data memory, and a serial interface. The microcontroller 112 receives the raw data from the transceiver 118, parses the data, and outputs the data via the computer interface port 114. The microcontroller 112 can also receive data from the computer interface port 114, and transmit some or all of the received data to a tag over communications line 113. In one embodiment, depending on the microcontroller or the microcontroller configuration, the computer interface port 113 is configured as a Universal Serial Bus ("USB") port, and in other embodiments, the computer interface port is implemented as a MIDI or serial interface.

Figure 6:
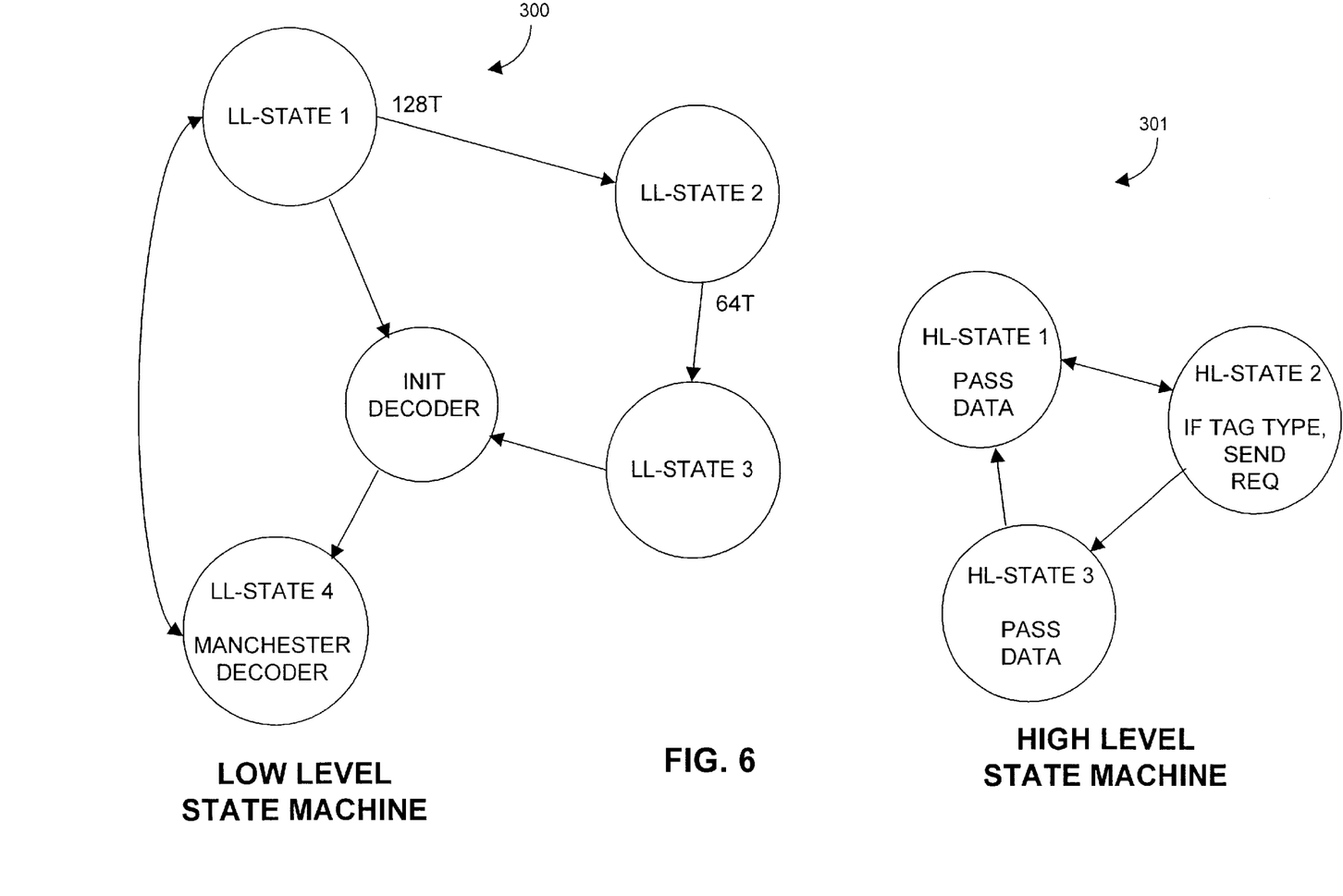
FIG. 6 is a schematic of a dual state machine according to an embodiment of the invention.

Referring to FIG. 6, in one embodiment, the software running on the microcontroller 112 is implemented as two state machines, a low-level state machine 300, and a high-level state machine 301. The low-level state machine 300 processes the data bits received from the transceiver 118, determines whether the received data is data or noise, and organizes the received data into packets. The high-level state machine 301 takes action based on the received data packets provided by the low-level state machine 300. For example, if the received data is a tag identifier (e.g. serial number) the high-level state machine will transmit the identifier, in an appropriate packet, to the computer via the communications port.

In one embodiment, the microcontroller software includes a main loop, which invokes the high-level state machine 301 functionability. The high-level state machine functionability takes action depending on the state, by invoking a software module for that state. In one embodiment, the high-level state machine 301 function invokes the low-level state machine when appropriate. The low-level state machine 300 determines the appropriate software module to invoke based on the current low-level state. The low-level state machine 300 interprets the received data edges. State 4 of the low-level state machine 300 (LL-STATE-4) is the running operation of the Manchester decoder. In this state, the low-level state machine 300 assembles a packet from the Manchester encoded data. States 1, 2, and 3, (LL-STATE-1, LL-STATE-2, LL-STATE-3) are used to identify data, and properly initialize the data used by the Manchester decoder in State 4.

In one embodiment, in LL-STATE-1, the low-level state machine looks either for a 128 T high pulse, which is the first signal sent by a Marin 4050 tag, or for 17 1's, which indicate the beginning of data from a Marin 4100 tag. The 128 T pulse is the first pulse that is sent by a Marin 4050 in the listen window sequence. Upon detecting a 128 T-length pulse, the state machine switches to LL-STATE-2, otherwise, the low-level state machine 300 stays at LL-STATE- 1. The low-level state machine 300 also looks for 17 1's (based on 64 T pulses), which is the marker for the header of a Marin 4100 packet. If 17 1's are received, the Manchester decoder is initialized, and the state machine changes to LL-STATE-4, to receive the rest of the packet from the 4100. In either case, the tag type (i.e. Marin 4100 compatible, Marin 4050 compatible or other tag type) is stored in the microcontroller memory once it is determined.

In LL-STATE-2, the low-level state machine 300 watches for a 64 T low pulse. This is the second step in the Marin 4050 listen window sequence. If a 64 T low pulse is received, the state is changed to LL-STATE-3. In LL-STATE-3, a Marin 4050 tag transmits the first bit of the Manchester encoded data, as the next step in the Marin 4050 listen window sequence. Once this bit is received, the Manchester decoder is initialized, and begins operation. The state is changed to LL-STATE-4.

In LL-STATE-4, the Manchester decoder is in operation, and decodes the bits received and passed on by the transceiver. In LL-STATE-4, the bits are assembled into packets of bytes. Based on the tag type information, the Manchester decoder will decode the data. For example, a Marin 4100 packet is 45 bits long, while a Marin 4050 packet is 54 bits. So, based on the tag type information, the correct number of bits will be received. When the correct number of bits has been received, a flag is set, referred to as the "read_done" flag, to indicate to the high-level state machine 301 that a packet is available.

The high-level state machine 301 interprets the data packets received by the low-level state machine 300, and passes the received data on to the computer 10 via the computer interface port. The high-level state machine 301 also sends commands to the tags. In HL-STATE-1, the software waits for a packet from a tag to be received by the low-level state machine, as indicated by the read_done flag. When a packet is received, the data is interpreted and forwarded to the computer via the computer interface port.

If the tag is identified as a tag type that contains additional data, the state is set to HL-STATE-2, so that additional commands can be sent to the tag. While waiting for packets, the software automatically sends a signal every 22 seconds to the transceiver which causes the transceiver to recalibrate. This is to compensate for changes in the environment, for example the placement of metal or other magnetic material near the transceiver. In one embodiment, the system also sends periodically, for example every 100 mS, a signal looking for a tag (such as a HITAG-1 tag) that does not automatically send a signal but that waits for a signal from the transceiver.

In HL-STATE-2, the software waits for a 128 T long pulse from a Marin tag that is part of the listen window sequence to be detected by the low-level state machine 300. If the listen window 128 T pulse is received, the high-level state machine sends a "Get" command to the transceiver to send to the tag, to instruct the tag to send its register contents. After the Get command is sent, the state is changed to HL-STATE-3.

In HL-STATE-3, the system reads each packet that is sent by a tag in response to a Get command. The low-level state machine 300 will set the read-done flag for each packet that is received. As data from each register is provided to the software from the tag by the transceiver, the software parses the data and transmits it via the computer interface port. When four packets have been received, the high-level state machine returns to HL-STATE-1.

In another embodiment, additional states are used to transmit other commands to tags, and to receive other information from the tags in a similar manner. The reception of packets in the high-level state machine 301 is keyed on the read done flag from the low-level state machine 300. Once the high-level state machine sees the read done flag, it acts upon the data, as appropriate depending on the tag type and the message.

This dual state machine implementation allows the system to interpret different types of tags. The low-level state machine initializes the Manchester decoder as appropriate for that tag, and then the Manchester decoder (as described for LL-STATE-4) interprets the data.

Figure 7:
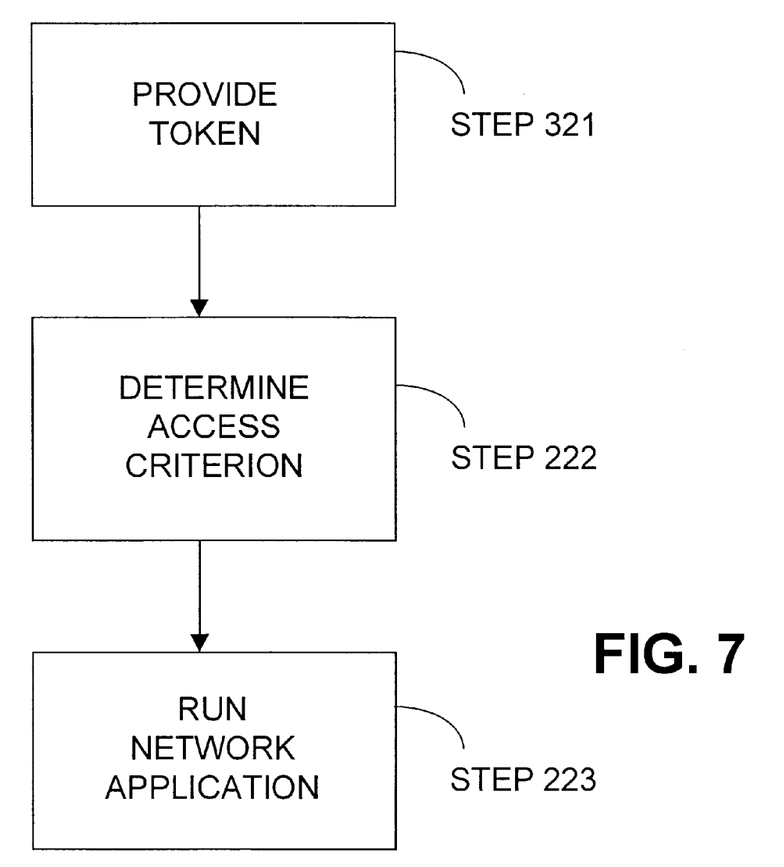
FIG. 7 is an embodiment of a method for network access in accordance with the invention.

Referring to FIG. 7, in one embodiment, a method for providing network access between a first node on a network and a second node on a network includes providing a tangible token comprising an identifier (STEP 321). The tag can be included or embedded in such tokens as a watch, key fob, cylindrical disk, credit card (ISO card), circular disk, embedded into a tangible object, or even embedded in a sticker or label. The node can be a personal computer, such as the computer 10 described above. In other embodiments, the node is another type of device connected to a network, for example a network appliance, an Internet Protocol telephone, and so on.

The method includes determining an access criterion associated with the identifier (STEP 222). In one embodiment, this includes waiting for a token to react to the signal provided by the reader, and for a return signal to be received by the reader from the token. The signal received from the token includes a token identifier, and also can include other information, for example user-specific information such as a username, password, PIN, and so on. In one embodiment, the access criterion is determined from the token identifier based on information stored in the first node, for example a list, table, or database. In another embodiment, the access criterion is determined from the token identifier and also from a receiver identifier. The first node performs a lookup in such list, table, or database, and determines an access criterion based on the token identifier and any such other information.

In another embodiment, the matching of identifier to access criterion is performed by a node other than the first node. For example, in one embodiment, the matching is performed by a third node. The third node contains a list, table, or database containing identifiers and associated access criterion information (and possibly other information), or otherwise has access to identifier and access criteria information. In this embodiment, the step of determining the access criterion includes transmitting a request including the identifier (and possibly other information) to a node on the network, which can be the first, second, or a third node, and is sometimes referred to as an access criteria server. The first node receives an access criterion in response to the request.

In one embodiment, the request and response are communicated using hypertext transfer protocol ("HTTP"). Using HTTP allows the request to be communicated through TCP/IP network proxies, caches, and firewalls, which are accustomed to handling HTTP requests and responses without requiring modifications specific to this application. In one embodiment, the access criteria server is a web server that receives the token identifier in the form of a web page request. In one embodiment, the request includes the token identifier as well as other information, which can include the type of token, the identifier or serial number of the token reader, the firmware version of the token reader, and the software version of the first node software. In one embodiment, the web request is of the form of a URL, having the form of Table 1, where the x's represent information specific to the request.

TABLE 1 http://x.prestotech.com/cgi-bin/query?TagID=x&TagType
=x&SerialNumber=x&ClientVersion=x&Firmware=x In one embodiment, the web server responds by transmitting a web page in a markup language such as hypertext markup language ("HTML"). In another embodiment, the response is a text file containing the access criterion. In one embodiment, the web server responds by transmitting a text file, having the information shown in Table 2. In this example, the token identifier is associated with an access criterion that directs the node to an electronic mail "email" access system at a designated URL, which in this example is the URL www.email.prestotech.com.

TABLE 2

Content-type=text/plain
ActionString=http://www.email.prestotech.com
Name=email.prestotech.com Email Envelope
Status=ReadOnly
Primary=x
Secondary=y
Update=<http://x.prestotech.com/z>

The information in Table 2 includes the content type, which describes the Multipurpose Internet Mail Extension ("MIME") type of the response, according to the hypertext transfer protocol. In this example, the response is in plain text format. The response includes an "ActionString," which in this case includes the access criterion. The ActionString includes a web address for the first node to use to provide access to the user's email account. The access criterion is therefore the URL link to the user's email server, which is found (in this example) at www.email.prestotech.com. The response includes a "NounName," which is an English name that can be used to identify the token. In this case the name is "email-service.com Email Envelope." The response includes a token Status identifier. In this case, the Status is ReadOnly, meaning that information should not be stored on the token. Other possible status options include invalid status, read/write status, and so on. The response includes a primary server address and a secondary server address. These addresses are used to update the configuration of the node. The response also includes an update identifier that indicates if an update to the first node software is available. The first node can access the update at x.prestotech.com/z.

The method also includes connecting the first node to the second node in response to the access criterion (STEP 223). In one embodiment, this includes running or launching a software or hardware application on the first node that uses some part or all of the access criterion to connect to the second node. The application can be any sort of application that can make use of data stored elsewhere on the network.

In one embodiment, the connecting step includes providing the access criterion to a web browser or other similar software that initiates a connection to the second node. Examples of web browsers that are commercially available are NETSCAPE NAVIGATOR from Netscape Communications Corporation of Mountain View, Calif., and MICROSOFT INTERNET EXPLORER from Microsoft Corporation of Redmond, Wash. In the example of Table 2, for example, the access criterion is the URL of a web-based email system, having the URL www.email.prestotech.com. The access criterion, when provided to the web browser, causes the web browser to connect to that URL, and provide the user with access to her email. In another embodiment, not shown in Table2, the access criterion includes access information, such as a username and password to be used for electronic mail access. In one embodiment, this access information is presented in the form of a URL, such as "http://www.email.prestotech.com/cgibin/mail?username=smith&password=bob."

In another embodiment, the first node connects to the second node by providing the access criterion to an electronic mail application running on the first node that initiates a connection to the second node. Electronic mail applications that are commercially available include EUDORA, available from Qualcomm, Inc. of San Diego Calif., and OUTLOOK available from Microsoft Corporation of Redmond, Wash. In one embodiment, the access criterion includes information provided to the electronic mail information about the user's preferences (e.g. mail server, username, password, etc.) that is to be used by the electronic mail application. Based on this information, the electronic mail program connects to the second node, which is an electronic mail server, and interacts with the electronic mail server to retrieve the user's electronic mail.

In another embodiment, the first node connects to the second node by providing the access criterion to a content player hardware or software application that initiates a connection to the second node. Content player applications include audio, video, and other such players. An example of a content player is the REALPLAYER PLUS G2 player available from RealNetworks, Inc. of Seattle, Wash. In one embodiment, the access criterion includes information for the content player about the source for content. For example, in one embodiment, the access criterion is a URL that is the source location on the network to receive audio, video, or other such content. Based on this information, the content player connects to the second node, which is a content server, and interacts with the content server to deliver the content.

In one embodiment, the token is used to refer to a specific file or document on a second remote node. A user requiring mobile access to the file or document on the second node uses the token to access her file from any node on the network. Since the token is unique, the token is used in a similar fashion to a physical key to control access to the file or document. In one such embodiment, the application is one of the applications just described, i.e. web browser, email application, or content player. In another such embodiment, the application is a text editor, graphics editor, sound editor, web page editor, or a word processor, or other similar "office" application, such as one of the applications available in the MICROSOFT OFFICE suite from Microsoft Corporation of Redmond, Wash.

In one embodiment, a set of tokens is used to coordinate the display of several images, files, or documents. Each token is used to refer to a specific image file, or document, and be contained within an object related to that item. This embodiment allows a user at a given node to quickly select different files in any order desired. The use of distinct tokens provides easy access to the referred documents when a keyboard or pointing device is unavailable or impractical, such as at a kiosk or during a presentation on a stage.

In one embodiment, the token is used to direct users to a specific content source. In another embodiment, the token is used as proof-of-purchase. In either case, the user is provided with a token (that is either purchased or provided without charge) that, through the operation of the method just described, is related to an access criterion. A content display, such as a web browser, email application, content player, etc., is directed to connect over the network to access or download content or information.

In one embodiment, just as each tag has an identifier that is read by the reader, each receiver 15 has an identifier (e.g. a serial number). In one embodiment, each receiver has a unique identifier. In one embodiment, the identifier is inserted into the tag and receiver as part of the manufacturing process. In the case of the receiver, in one embodiment, the identifier is inserted into the microcontroller software code when the microcontroller is programmed. In another embodiment, the identifier is loaded into the microcontroller either before or after the receiver is manufactured via the communications interface, and the identifier is stored in the microcontroller EEPROM. The receiver 15 identifier is useful in various applications. In one embodiment, the receiver identifier is communicated along with a web request such as the request of FIG. 1. In another embodiment, the access criterion is determined at least in part in response to the receiver identifier.

In one embodiment, the receiver is used as part of a security application. The presentation of the token including the tag is used, alone or in combination with other factors, to identify a user and allow access to information and/or resources. In one embodiment, the receiver identifier is also used in the access determination. In one embodiment, a user is granted access to information and resources based at least in part upon the location of the receiver, where the receiver 10 identifier is used to determine the location of the computer 10.

For example, in one embodiment, a user operates a computer 10 and presents her tag (which may be contained within a key fob or other token) to a reader 15 connected to a computer 10. The tag identifier and the receiver identifier are passed on to the computer 10 by the receiver 15. The computer 10 either accesses a local database 85, or sends the information to a server. The server determines whether the user is allowed to access the computer 10, at least in part based on the receiver identifier. In one embodiment, the access determination depends at least in part on whether the user is allowed to access computers where that computer is located, where the location is determined based on the receiver 15 identifier.

If the user is allowed to access the computer 10, the user's credentials are provided to the computer 10. For example, in one embodiment, the computer is running WINDOWS NT, and the user's WINDOWS NT login credentials are provided to the computer 10 if the user is allowed to access the computer 10. The user accesses the computer 10 without the user having to type a password or username. In another embodiment, the user enters username and password information in addition to presenting the tag, for additional security protection. At another workstation, the user might be denied access because the receiver identifier/tag identifier combination is not on the allowed list.

In another embodiment, a user is presented with different security challenges depending on the location. For example, in an embodiment in which access to financial information (e.g. securities account status) is based in part on the tag identifier and the receiver identifier. At home or work (as determined by the receiver identifier) the user is permitted access to her securities portfolio account without requiring additional challenge. However, from a neighbor's house or a public kiosk, an additional screen is presented which requests a PIN or password before access is granted.

In another embodiment, a regional location is used to determine the amount of information that is required from a user before access is granted. For example, the token can be used for access to a credit account, such as a telephone charge card or a credit card. The first time the token is used in a city other than the user's home, a time-consuming challenge is presented. Once authenticated in that city, a less time-consuming challenge might be used. For example, a simple PIN or password might be acceptable once the user has been identified in the new location.

In another embodiment, certain information or access is not available in certain locations. For example, unlimited access to credit might be available when used at home, but a smaller limit placed on transactions outside the home. A telephone charge card, for example, might allow one to place any sort of phone call from home, but a call to another country might not be permitted from outside the home.

In another embodiment, the location of the receiver (and thus the computer) helps determine the information that is shown or displayed to a user. This is referred to as context, or contextualization. The use of the receiver can be used to provide a contextualized system, because the user and the user's location is identified by the tag identifier and receiver identifier. Often, there is too much information about a tag owner to be universally displayed for all service personnel (and the owner themselves). By formatting and filtering the data to a view that is particular to the service station (i.e. location), the service staff will have an easier time providing prompt and accurate service, which is useful for the service staff, the customer, and the corporation providing the service.

As one example, in a contextualized medical provider computer system (e.g. an enterprise computer system in a HMO office), a user's medical plan card (which incorporates a tag as described above) will, depending on the location as determined by the receiver identifier, trigger the display of appointment and billing information when presented at the receptionist's desk; trigger the display of medical charts in the examining room; will allow for the entry of prescription information at the doctor's desk; will display that same prescription information at the pharmacy; and when used at home allows the patient to manage her medical appointments, refill prescriptions, see doctor's take-away instructions, and so on.

As another example, in a hotel information system, the token (and associated tag) not only identifies the records of a specific guest based on the serial number of the transponder, but also orders and highlights the information based on the service location. In such a system, the service staff have access to the guest's itinerary and pending messages at all locations, while at the front desk, information about the guest's room preferences are displayed. At the Bell Captain's station, a note about where the guest's car has been valet parked is presented, and at the bar, the guest's "usual" or last drink preference is displayed to the bartender.

In an airline information system, the user can view his or her itinerary from public kiosks, while use of the token at the ticket counter will show the agent seating and meal preferences. The club lounge could have quick access to the customer's drink preferences, or payment information.

In another embodiment, the receiver identifier is used to identify the capabilities of the computer 10, so that information can be adapted to those capabilities. For example, at a sound only station, words would be spoken through a text-to-speech synthesizer, while at a video output station the words would have been typeset. The system could even know the resolution and other parameters of the display system and adapt accordingly, based on the receiver identifier.

Variations, modifications, and other implementations of what is described herein will occur to those of ordinary skill in the art without departing from the spirit and the scope of the invention as claimed.

For example, in other embodiments, where the computer 10 connected to the receiver is not a personal computer, but is any sort of network node, for example, a smaller device containing a processor and communication interface to the reader. Examples of such devices are internet appliances (such as the Internet tuner available from Kerbango of Cupertino, Calif.), telephones such as an internet protocol telephones (commercially available from pingTEL of Woburn, Mass. and Symbol Technologies, Inc. of New York) and mobile (e.g. cellular) telephones (such as those available from Motorola and Nokia), or personal digital assistants (such as a Palm Pilot from Palm Computing Corporation).

Also, while this description describes an implementation using a RFID reader, it should be clear that the applications can use other technologies that provides a (wirelessly) readable signature or code embedded into a small package, typically a chip that can be incorporated into an article, but also including such technologies such as infrared communication and information recorded on magnetic strips.

Accordingly, the invention is to be defined not by the preceding illustrative description but instead by the spirit and scope of the following claims.

What is claimed is:

1. A method for communicating with a RFID tag, the method comprising the steps of:

transmitting an excitation signal to the RFID tag;

receiving a signal comprising RFID tag information from the RFID tag;

identifying the RFID tag type from the received signal;

sending a request for additional data to the RFID tag based on the identified tag type.

2. The method of claim 1, further comprising the step of parsing the received signal responsive to the identified tag type.

3. The method of claim 1, further comprising the step of receiving information stored in the tag in response to the request additional data.

4. The method of claim 1 wherein the step of receiving information stored in the tag in response to the request for additional data comprises:

receiving a second signal comprising information stored in the RFID tag from the RFID tag; and identifying further the RFID tag type from the second signal;

parsing the second signal responsive to the further identified tag type to obtain the information stored in the RFID tag.

5. The method of claim 3 further comprising the step of communicating the received information to a computer.

6. The method of claim 5, further comprising the step of communicating a RFID tag reader identifier that uniquely identifies a RFID tag reader to the computer.

7. A method for communicating RFID tag information, comprising:

illuminating by an RFID tag reader an RFID tag;

receiving a signal comprising tag information from the RFID tag;

transmitting the received tag information from the RFID tag reader to a network node in communication with a data network;

transmitting from the RFID tag reader to the network node a RFID tag reader identifier that uniquely identifies the RFID tag reader.

8. An RFID tag reader system for communicating with a RFID tag, comprising:

an RFID tag exciter for transmitting an excitation signal to an RFID tag;

a receiver for receiving a signal comprising RFID tag information from a RFID tag;

an identification module for identifying the RFID tag type from the RFID tag signal; and an RFID tag transmitter for transmitting a request for additional data to the RFID tag based on the RFID tag type.

9. The method of claim 8, wherein the receiver is also for receiving a response from the RFID tag to the data request to the RFID tag for additional data, and for parsing the response from the RFID tag based on the tag type.

10. The system of claim 9, wherein the receiver receives information stored in the tag in response to the request for additional data.

11. The system of claimed 10 further comprising a transmitter for communicating the received information to a computer.

12. The system of claim 10, wherein the transmitter communicates a receiver identifier that uniquely identifies a RFID tag reader to the computer.

13. A RFID tag reader system for communicating RFID tag information, comprising:

an RFID tag exciter for transmitting an excitation signal to an RFID tag;

a RFID tag information receiver for receiving RFID tag information from a RFID tag in response to the excitation signal;

a RFID tag reader identifier that uniquely identifies a RFID tag reader; and a transmitter for transmitting the RFID tag information and the RFID tag reader identifier from the RFID tag reader to a computer over a communication link between the RFID tag reader and the computer.

14. The system of claim 13, wherein the computer is in communication with a data network, and wherein the computer receives the tag information and the reader identifier from the transmitter and communicates the tag information and the reader identifier over the data network.

15. The system of claim 14 wherein the computer is a personal computer and the data network is the Internet.

16. The system of claim 13 wherein the RFID tag information receiver is for requesting and receiving additional data from the RFID tag responsive to the RFID tag type.

17. The method of claim 5, wherein the method steps are performed by an RFID reader, and wherein the computer comprises a network node in communication with the RFID reader and a data network.

18. The method of claim 17, wherein the network node comprises a personal computer and the data network comprises the Internet.

19. The method of claim 1 wherein the RFID tag information comprises a RFID tag identifier.

20. The method of claim 7 wherein the network node comprises a personal computer and the data network comprises the Internet.

21. The method of claim 20 further comprising the step of communicating, by the network node, the received tag information and the RFID tag reader identifier over the Internet to another network node.

22. The method of claim 8 wherein the RFID tag information comprises a RFID tag identifier.

23. The system of claim 11 wherein the computer comprises a network node in communication with a data network.

* * * * *